United States Patent [19]

Hitomi

[11] Patent Number: 5,098,031
[45] Date of Patent: Mar. 24, 1992

[54] SPINNING REEL WITH ECCENTRIC ELEMENT FOR MOVING BAIL ARM LEVER

[75] Inventor: Yasuhiro Hitomi, Sakai, Japan
[73] Assignee: Shimano Corporation, Osaka, Japan
[21] Appl. No.: 621,972
[22] Filed: Dec. 4, 1990

[30] Foreign Application Priority Data

Dec. 5, 1989 [JP] Japan ............................ 1-141385[U]

[51] Int. Cl.⁵ ............................................. A01K 89/01
[52] U.S. Cl. ................................................. 242/233
[58] Field of Search ................. 242/230, 231, 232, 233

[56] References Cited

U.S. PATENT DOCUMENTS

| | | | |
|---|---|---|---|
| 3,289,027 | 6/1983 | Sazaki et al. | 242/233 |
| 4,427,161 | 1/1984 | Sakumoto | 242/233 |
| 4,824,040 | 4/1989 | Carpenter et al. | 242/233 |
| 4,923,140 | 5/1990 | Yamaguchi et al. | 242/233 X |
| 4,941,626 | 7/1990 | Carlsson | 242/231 |

FOREIGN PATENT DOCUMENTS 60-5366  1/1985  Japan .
61-186361 11/1986 Japan .

Primary Examiner—Katherine Matecki
Attorney, Agent, or Firm—Dickstein, Shapiro & Morin

[57] ABSTRACT

A spinning reel having a simple and lightweight construction and yet allowing selection of an amount of pivotal movement of a bail corresponding to movement of a control member is formed of a pair of support arms attached to a rotatable member supported to be rotatable on a first axis of a reel body, a bail extending between the support arms to be pivotable on a second axis to switch between a windup position for winding a fishing line onto a spool and a release positon for unwinding the fishing line from the spool, and a control member movable toward and away from the first axis. The reel has an eccentric element which is operable by the control member to pivot on a third axis extending parallel to the second axis, and a contact/transmission mechanism including a pair of contact elements contactable with each other to transmit torque from the eccentric element to the bail. The bail is pivotable toward the release position through the eccentric element and the contact/transmission mechanism when the control member is operated away from the first axis.

5 Claims, 4 Drawing Sheets

SPINNING REEL WITH ECCENTRIC ELEMENT FOR MOVING BAIL ARM LEVER

BACKGROUND OF THE INVENTION

1. Field of the Invention

The present invention relates to spinning reels, and more particularly to a spinning reel comprising a pair of support arms attached to a rotatable member supported to be rotatable on a first axis of a reel body, a bail extending between the support arms to be pivotable on a second axis to switch between a windup position for winding a fishing line onto a spool and a release position for unwinding the fishing line from the spool, and a control member movable toward and away from the first axis.

2. Description of the Prior Art

Conventional constructions for operating the bail to the release position in a spinning reel as constructed above are disclosed in Japanese Utility Model Publications Kokai Nos. 61-186361 and 60-5366. The construction disclosed in the former, as shown in FIG. 10, comprises an arm lever 8' pivotable with a bail 9' and including a contact element 20', and a control member 10' for applying a pressing force to the contact element 20' to cause the arm lever 8' to move in a forward, release direction. The contact element 20' defines a cam surface so that the arm lever 8' is pivotable by a selected amount in response to a unit amount of operation of the control member 10'. The construction disclosed in the latter, as shown in FIG. 12, has a link mechanism L' interposed between an arm lever 8' and a control member 10' to cause the arm lever 8' to pivot a selected amount in response to a unit amount of operation of the control member 10'.

Situations in which the bail is moved to the release position are considered now. According to the disclosure of the former publication, the contact element defines a cam surface so that, in an initial state of operation, the control member is operable with ease by stretching a finger of the angler even in a situation where it is relatively difficult to apply a force through a fingertip, and that the bail may be caused to pivot quickly in an intermediate stage of operation where it is easy to apply a force through the fingertip.

However, in the construction in which the pivotal movement of the bail is accelerated with variations in the position of contact between the control member and cam surface, for example, the cam surface has a reduced radius of curvature for accelerating the pivotal movement of the bail at an intermediate stage of operation, and the pressing force concentrates on the cam surface. Consequently, the cam surface and/or control member will easily be worn or deformed.

This type of spinning reel in particular usually includes a toggle spring or the like for maintaining the bail in either the windup position or the release position. The wear or deformation noted above tends to occur all the more as a result of use over a long period. Thus, there is room for improvement.

In the latter construction, the amount of pivotal movement of the bail corresponding to the unit amount of operation of the control member may be selected by determining an arm ratio of the link mechanism. Compared with the construction employing the cam surface, this construction has an advantage of being relatively free from wear and deformation. However, the construction employing the link mechanism requires link elements interconnecting the arm lever and control member. This addition not only impairs the weight balance of the pivoting system but requires a space for accommodating the link elements as well as a support axis for supporting the link elements. Consequently, the construction becomes complicated, with an enlarged linkage system. Thus, the latter construction also has room for improvement.

SUMMARY OF THE INVENTION

An object of the present invention is to provide a spinning reel having a simple and light construction and yet allowing selection of an amount of pivotal movement of the bail corresponding to movement of the control member.

The above object is fulfilled, according to the present invention, by a spinning reel having a bail switchable between a windup position and a release position as noted hereinbefore, which comprises an eccentric element operable by the control member to pivot on a third axis extending parallel to the second axis, and a contact/transmission mechanism including a pair of contact elements contactable with each other to transmit torque from the eccentric element to the bail, wherein the bail is pivotable toward the release position through the eccentric element and the contact/transmission mechanism when the control member is operation away from the first axis.

According to this construction, the bail is pivotable toward the release position through the eccentric element and the contact/transmission mechanism when the control member is operated away from the first axis. Since the eccentric element is pivotable on the third axis extending parallel to the second axis, the angle of pivotal movement of the eccentric element differs from that of the bail. The contact/transmission mechanism includes a pair of contact elements contactable with each other to transmit torque from the eccentric element to the bail, as noted above. These contact elements provide an allowance that eliminates an inconvenience due to the difference in the pivoting angle between the eccentric element and the bail. Moreover, since the contact/transmission mechanism serves the purpose if the pair of contact elements are mutually contactable, this mechanism has a simpler, lighter and more compact construction than the mechanism including links.

The present invention, therefore, realizes a spinning reel having a simple and light construction and yet allowing selection of an amount of pivotal movement of the bail corresponding to movement of the control member. This construction allows an increased freedom for designing the cam surface and the like, and is effective in solving the problem of wear as noted hereinbefore.

In working the present invention, for example, the third axis may be disposed relative to the second axis such that the control member causes the eccentric element to pivot through a smaller angle than the arm lever. This arrangement renders the bail pivotable by an increased amount with a small amount of operation of the control member.

Other objects, features and advantages of the present invention will be apparent from the following description of the preferred embodiment.

BRIEF DESCRIPTION OF THE DRAWINGS

The drawings show a spinning reel according to the present invention, in which.

DESCRIPTION OF THE PREFERRED EMBODIMENT

An embodiment of the present invention will be described hereinafter with reference to the drawings.

Figure 5:
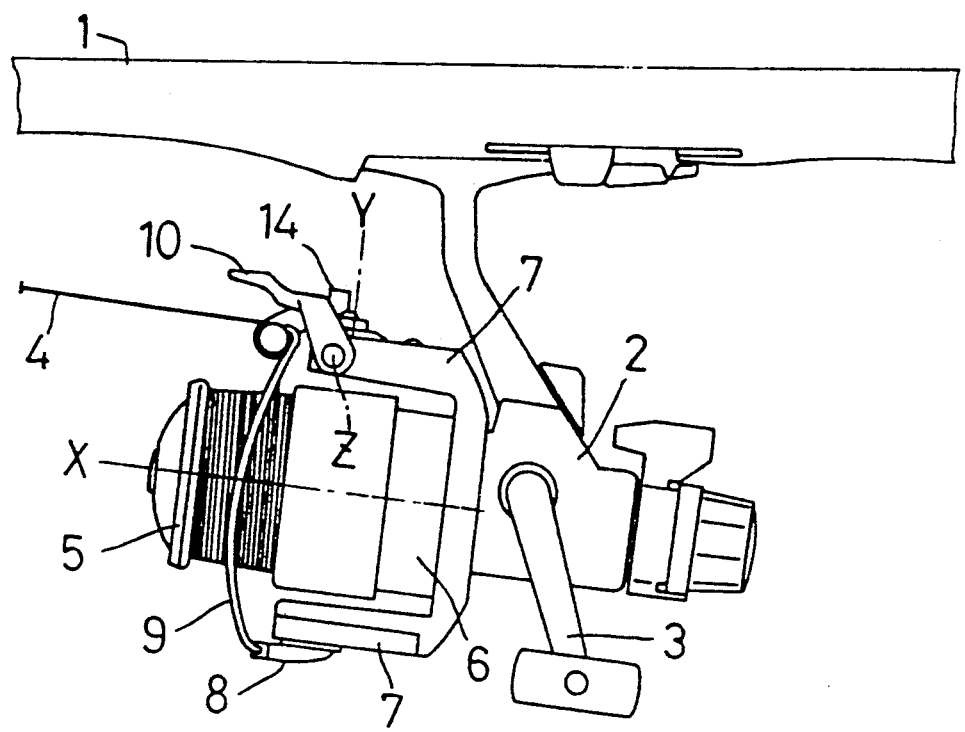
FIG. 5 is a side elevation of the spinning reel.

As shown in FIG. 5, a spinning reel comprises a reel body 2 attached to an undersurface of a fishing rod 1. The reel body 2 includes a windup handle 3 attached laterally thereof. The reel body 2 further includes, mounted forwardly thereof, a spool 5 for winding a fishing line 4, and a rotatable member 6 rotatable on a forwardly extending first axis X by turning the handle 3. Support arms 7 are provided opposite each other across the first axis X of the rotatable member 6. The support arms 7 have large diameter stubs 17 which support arm levers 8 for pivotal movement on a second axis Y extending perpendicular to the first axis X. A bail 9 extends between these arm levers 8.

Referring to FIGS. 1 through 4, the bail 9 is pivotable on the second axis Y with the two arm levers 8 to switch between a windup position for winding up the fishing line 4 to the spool 5 and a release position for unwinding the fishing line 4 from the spool 5.

This spinning reel includes a lever type control member 10 for quickly setting the bail 9 to the release position. The control member 10 is liftable to switch the bail 9 to the release position. The fishing line 4 is guided from a line roller 11 attached to one of the arm levers 8 toward a tip end of the fishing rod 1. The bail 9 is switched to the release position together with the arm lever 8 by catching the control member 10 with a fingertip of his or her hand holding the fishing rod 1 and at the same time lifting it toward the fishing rod 1, i.e. away from the first axis X.

More particularly, an eccentric element 13 is superposed on an outer surface of the arm lever 8 to which the control member 10 is operatively connected. The eccentric element 13 is rotatable on a shaft 16 located on a third axis P extending parallel to and forwardly spaced from the second exis Y, and imparts its torque to the arm lever 8 through a pin 12 and through a slot 8a defined in the arm lever 8, the pin 12 and slot 8a acting as a contact/transmission mechanism. A contact element 14 projects from an outer surface of the eccentric element 13 for contacting the control member 10 to receive a pressing force therefrom. The control member 10 is supported by one of the support arms 7 to be pivotable on an axis Z extending perpendicular to the first axis X and second axis Y.

The slot 8a extends radially of the arm lever 8. The support arm 7 associated with this arm lever 8 contains a toggle mechanism 15 including a compression spring 15a for applying an urging force through a pin 15b to the arm lever 8.

When switching the bail 9 to the release position, the control member 10 is turned away from the first axis X whereby the eccentric element 13 is caused by an operating force transmitted from the control member 10 through the contact element 14 to pivot on the third axis P. The torque thereby produced is transmitted through the pin 12 and slot 8a to the arm lever 8. As a result, the bail 9 pivots with the arm lever 8 about the second axis Y to be set to the release position.

When setting the bail 9 to the release position as above, the pin 12 moves through the slot 8a toward the second axis Y with turning of the eccentric element 13 since the second axis Y of the arm lever 8 and the third axis P of the eccentric element 13 are displaced from each other. In other words, the bail 9 is pivotable with a relatively easy operating force in an initial stage of operation, and pivotable rapidly with an amount of movement of the bail 9 increasing relative to a unit amount of movement of the control member 10 as the operation is continued.

In this embodiment, the contact element 14 defines a cam surface 14a for contacting the control member 10. This cam surface 14a is shaped to increase the amount of movement of the bail 9 relative to the unit amount of movement of the control member 10. Consequently, the above releasing operation is amplified to promote its effect.

Figure 6:
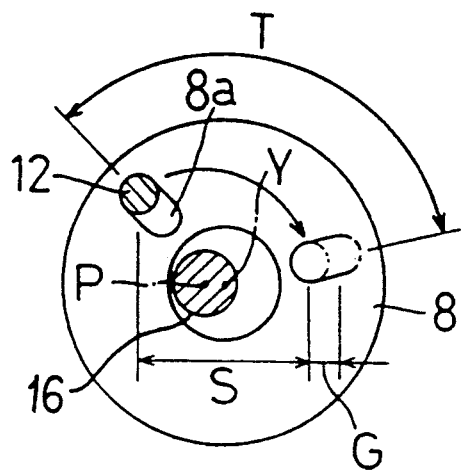
FIG. 6 is a schematic plan view showing a release operation.
Figure 11:
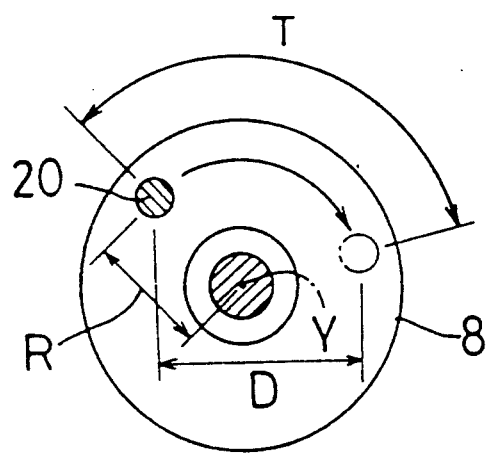
FIG. 11 is a schematic view of an operation of a comparative example.
Figure 12:
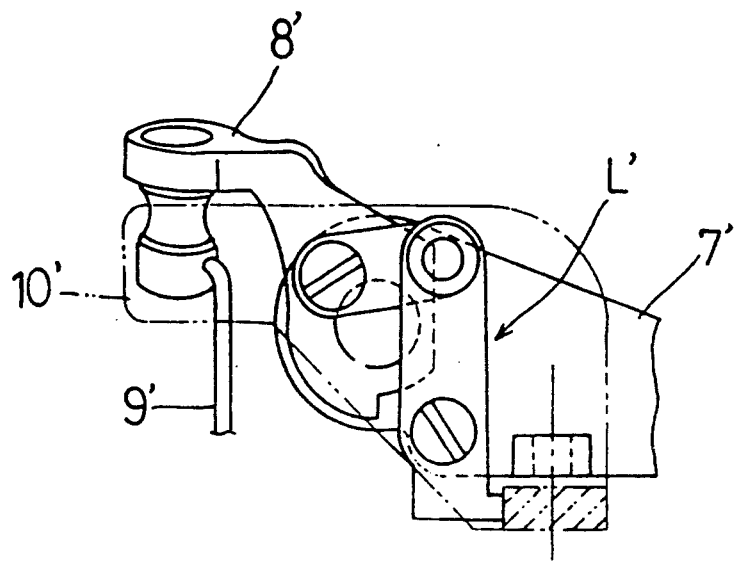
FIG. 12 is a plan view of another conventional construction.

A comparison is made hereunder in the movement of the arm lever between the construction according to the present invention and the known construction having a contact element. As shown in FIGS. 6, when the arm lever 8 is caused to pivot through a predetermined angle T in the construction according to the present invention, the pin 12 moves toward the second axis Y, i.e. the pin 12 acts on the arm lever 8 with reducing radius, thereby accelerating the arm lever 8. According to the known construction, as shown in FIG. 11, the contact element 20 for receiving a pressing force from the control member 10 is movable coaxially with the arm lever 8 (i.e. the radius R remains constant). The amount of movement of the contact element 20 for causing the pivotal movement of the arm lever 8 through the predetermined angle T corresponds to the angle T of the movement of the arm lever 8, and thus no acceleration takes place.

Figure 1:
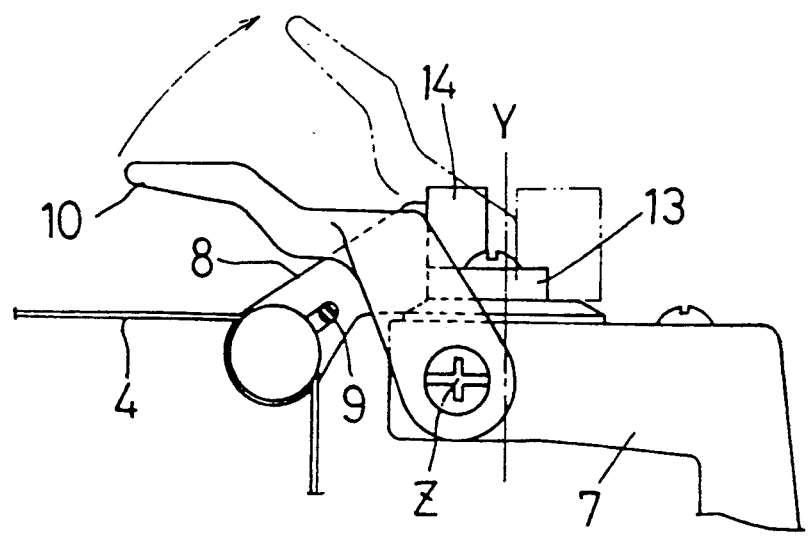
FIG. 1 is a side view of a control member and adjacent components.
Figure 2:
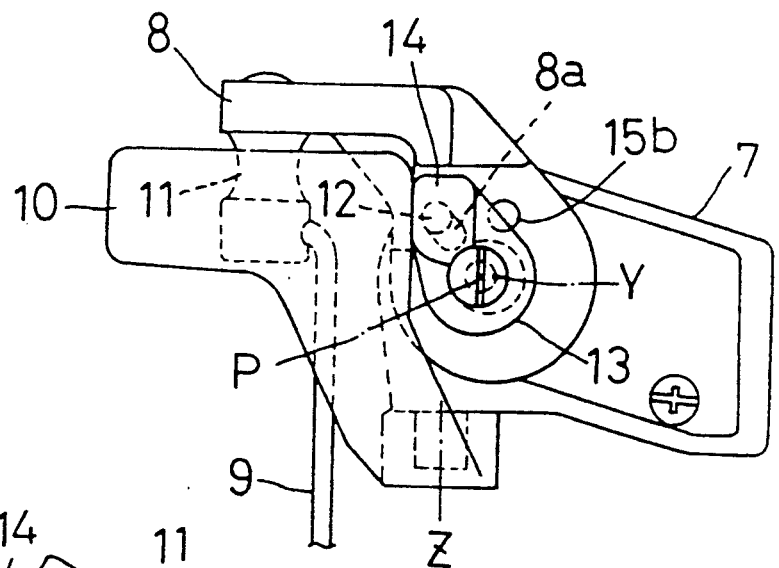
FIG. 2 is a plan view of the control member in a windup position.
Figure 3:
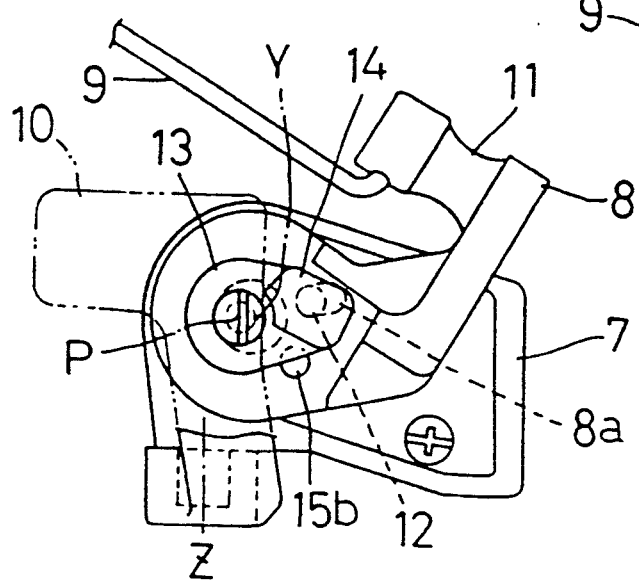
FIG. 3 is a plan view of the control member in a release position.
Figure 4:
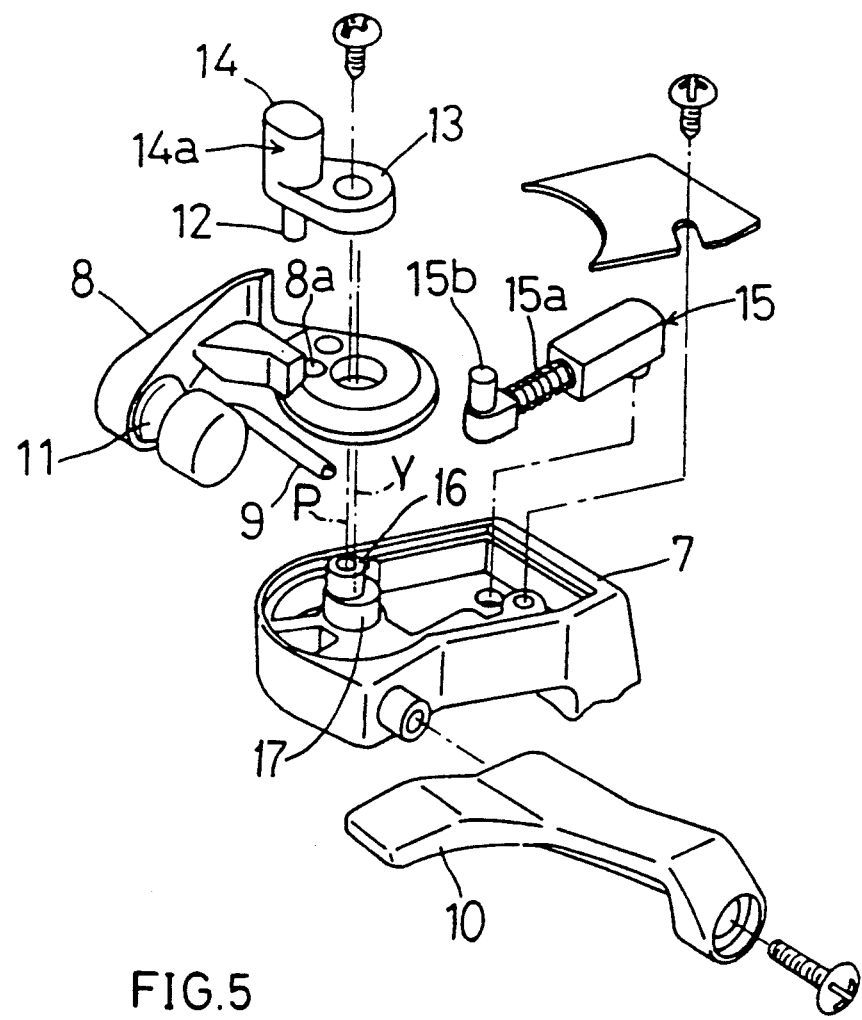
FIG. 4 is an exploded perspective view of a bail control system.
Figure 10:
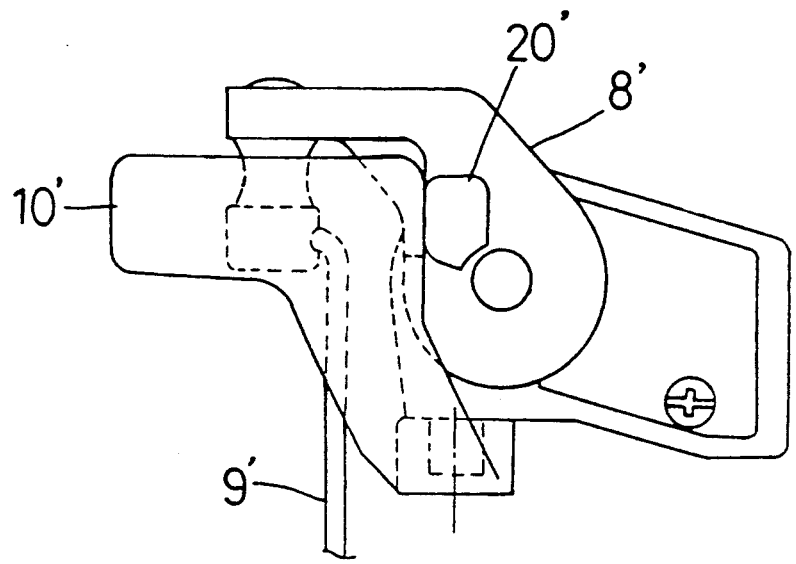
FIG. 10 is a plan view of a control member and adjacent components in a conventional construction.

Further, with the construction according to the present invention as seen in the direction shown in FIG. 2, and with the known construction as seen in the direction shown in FIG. 10, rightward movement of the conspective control members 10 is converted into a rotary motion. Assuming that the contact element 14 in the construction according to the present invention has the same shape as the pin 12 shown in FIG. 6 and that the contact element 20 in the known construction is shaped as in FIG. 11, the operating stroke of the control member 10 required for causing the arm lever 8 to pivot through the predetermined angle T has a value D in the known construction as shown in FIG. 11, and has a value S in the construction according to the present invention as shown in FIG. 6, the latter being less than the former by a value G.

In other words, the construction according to the present invention, without a cam structure provided between the control member and contact element, allows the control member to be operated with a relatively small force in an initial stage of operation. The pivotal movement of the bail is accelerated as the operation is continued. Moreover, the present invention realizes a reduced operating stroke of the control member.

Figure 7:
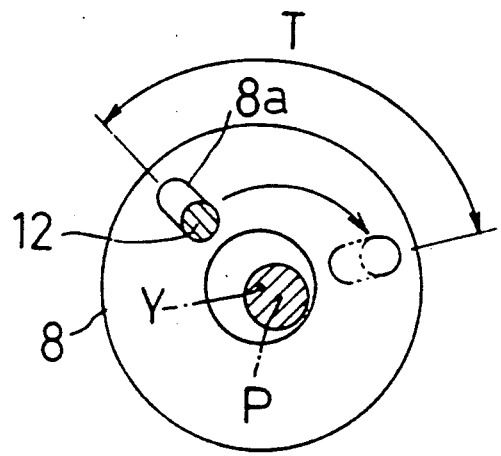
FIGS. 7 through 9 are schematic plan views showing operations with an eccentric element placed in varied positions, respectively.
Figure 8:
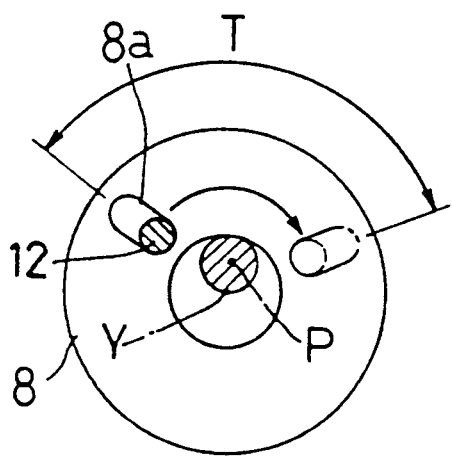
Figure 9:
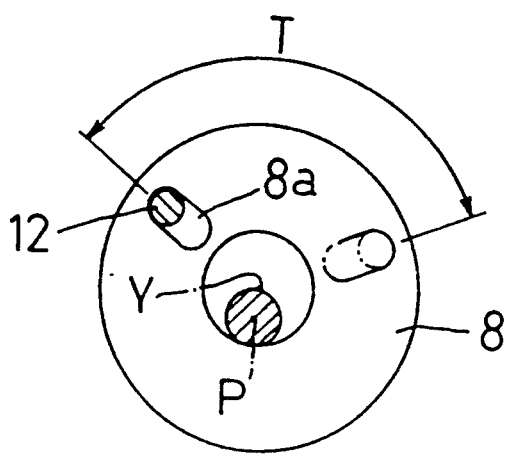

Apart from the foregoing embodiment, the present invention may be worked without the cam surface provided for the contact element for transmitting the pressing force from the control member to the eccentric element. The eccentric element may be set eccentric in any appropriate direction. That is, the third axis P of the eccentric element 13, the second axis Y of the arm lever 8, the pin 12 and the slot 8a may be arranged in different positional relations as shown in FIGS. 7, 8 and 9. In the construction shown in FIG. 7, the pin 12 moves outwardly from an inward position when the control member 10 causes the arm lever 8 to pivot toward the release position. Consequently, the pivoting speed of the arm lever 8 becomes slower with a constant rate operation of the control member 10. In the construction shown in FIG. 8, the pin 12 moves outwardly from an inward position and then back inwardly when the control member 10 causes the arm lever 8 to pivot toward the release position. This results in the pivoting speed of the arm lever 8 becoming slower once and thereafter becoming faster with a constant rate operation of the control member 10. In the construction shown in FIG. 9, the pin 12 moves inwardly from an outward position and then back outwardly when the control member 10 causes the arm lever 8 to pivot toward the release position. This results in the pivoting speed of the arm lever 8 becoming faster once and thereafter becoming slower with a constant rate operation of the control member 10.

The present invention may be worked in varied ways such as by forming the control member with a bent rod material.

The bail may be pivotable by an increased amount with a small amount of operation of the control member where, as shown in FIGS. 6, 7 and 9, the third axis P is disposed relative to the second axis Y such that the control member 10 causes the eccentric element 13 to pivot through a smaller angle than the arm lever 8.

What is claimed is:

1. A spinning reel, comprising:
   a reel body having a first axis;
   a rotatble member rotatable about said first axis of said reel body;
   first and second support arms mounted on said rotatable member;
   first and second arm levers, said first arm lever being pivotably supported on said first support arm, said second arm lever being pivotably supported on said second support arm, said first and second arm levers being pivotable about a second axis, said first arm lever having a through bore, an outer surface and a first contact/transmission element;
   a bail extending between said arm levers;
   means for switching said first arm lever between a take-up position for winding up a fishing line around a spool through said bail and a release position for feeding out said fishing line from said spool;
   a shaft which is mounted on said first support arm and which extends through said through bore of said first arm lever, said shaft being located on a third axis which is parallel to and offset from said second axis;
   an eccentric element which overlies said outer surface of said first arm lever and which is pivotably connected to said shaft, said eccentric element having a second contact/transmission element and a contact element, said contact/transmission elements being engageable with each other;
   a contact/transmission mechanism for causing said first arm lever to pivot about said second axis together with pivotal movement of said eccentric element about said third axis, said contact/transmission mechanism comprising said first and second contact/transmission elements, one of said contact/transmission elements being a slot and the other of said contact/transmission elements being a pin; and
   a control member movable toward and away from said first axis, wherein said control member presses said contact element to pivot said eccentric element about said third axis to thereby move said first arm lever to said release position.

2. A spinning reel as claimed in claim 1, wherein said slot is an element of said first arm lever, said pin being an element of said eccentric element.

3. A spinning reel as claimed in claim 2, wherein said first support arm has a large diameter stub which fits within said through bore of said first arm lever such that said first arm lever is pivotable about said large diameter stub, said shaft being located on said large diameter stub, said shaft having a diameter which is smaller than the diameter of said stub.

4. A spinning reel as claimed in claim 3, wherein said third axis is disposed relative to said second axis such that said bail is pivotable at an initial speed with a relatively easy operating force applied to said control member in an initial stage of operation and is pivoted more rapidly as the operation is continued.

5. A spinning reel as claimed in claim 1, wherein said third axis is disposed relative to said second axis such that said control member causes said eccentric element to pivot through a smaller angle than said bail.

* * * * *